United States Patent [19]
Latka et al.

[11] 3,989,374
[45] Nov. 2, 1976

[54] ELECTRONIC TIMING DEVICE

[76] Inventors: Henry C. Latka, 158 Berkley St., Rochester, N.Y. 14607; David J. Leveille, 166 North St., Rochester, N.Y. 14604

[22] Filed: June 23, 1975

[21] Appl. No.: 589,424

[52] U.S. Cl. .................................. 355/69; 307/293; 317/141 S; 328/129; 355/67
[51] Int. Cl.² .......................................... G03B 27/70
[58] Field of Search ................... 355/35, 36, 37, 67, 355/69, 70, 71, 115; 315/360; 328/131, 129; 317/141 S, 142; 307/293 R, 293 E, 293 F, 293 G, 293 H, 293 I, 293 J, 293 T, 294

[56] References Cited
UNITED STATES PATENTS

| | | | |
|---|---|---|---|
| 3,640,620 | 2/1972 | Shatz et al. | 315/360 |
| 3,672,767 | 6/1972 | Pamlenyi | 355/69 |
| 3,721,908 | 3/1973 | Jurjans | 328/131 |
| 3,739,199 | 6/1973 | Negrou | 307/293 J |
| 3,832,054 | 8/1974 | Sable | 355/35 |
| 3,876,950 | 4/1975 | O'Connor | 317/141 S |

*Primary Examiner*—Russell E. Adams, Jr.
*Attorney, Agent, or Firm*—Fred L. Denson

[57] ABSTRACT

A novel electronic timing apparatus is described which contains means for selecting a preset time interval and means for selecting an actual interval to be timed which is equal to or less than, and also a function of, the preset interval. When the apparatus begins timing an actual interval, a first energy source is activated and a second energy source is deactivated. When timing of the actual interval is completed, the first energy source is deactivated and the second energy source is activated. The appartus is powered by a power supply means which furnishes a regulated direct current to integrated circuits requiring such and furnishes line frequency current to other circuits. It also contains means for generating and shaping periodic pulses from line frequency current to form an electronic time base signal for its operation. A time base prescaler means reduces the number of periodic pulses contained in the electronic time base signal, the reduction being proprotionately responsive to a signal generated by the actual interval selection means. The time base prescaler means is continually reprogrammed with the signal generated by the actual interval selection means by a time base prescaler control logic means. An electronic counting means counts the number of periodic pulses contained in the electronic time base signal after the signal has been modified by the time base prescaler means. When the electronic counting means reaches a timed out state representative of the elapse of the actual interval being timed, a system logic control provides a signal which is used to deactivate the first energy source and activate the second energy source. Other features of the invention, such as its use in photographic applications and its ability to be reset under various timing conditions, are described herein.

15 Claims, 7 Drawing Figures

ELECTRONIC TIMING DEVICE

BACKGROUND OF THE INVENTION

This invention relates to a novel electronic timing apparatus for use where precision time measurements are required such as in photographic processes.

Among the basic steps included in conventional photographic processes are the exposure of photographic film to an image, development of the film into a photographic negative and the production of a photographic print from the negative. Each of these steps involves reactions which are dependent upon several variables such as temperature, time, light, etc. Photographic print papers are light sensitive i.e. they undergo a reaction and retain latent image information when struck by light or some other form of actinic radiation. The extent to which a change takes place is generally dependent upon the amount of light energy striking the surface of the light sensitive paper. The total quantity of light which strikes the surface of the print paper is a function of the intensity of the light source as well as the time of exposure of the light sensitive paper to the light source. Thus, print exposure time is a very critical variable.

During the production of a photographic print it is not uncommon to experience photographic negatives which will not render a print which is in technical and- /or asthetic tonal balance across the entire print surface. It is the usual practice for those engaged in the photographic printing trades to utilize "burning", "dodging" and "masking" techniques to remedy this condition. The method commonly used involves exposing the photographic print paper for a preset period of time, usually seconds, which will render a basic print. This step might include the use of "dodging" and/or "masking" techniques to reduce or eliminate light energy from exposing certain areas of the print paper. Thereafter, if it is determined that certain areas of the print are underexposed, these areas are reexposed for a select period of time utilizing "burning", "dodging" and/or "masking" techniques. The use of such staged printing can involve a multitude of reexposures and it is desirable for the reexposure time durations to be accurate, repeatable percentages of the original exposure duration in order to produce a print that is in technical and/or aesthetic tonal balance.

The printing process itself involves setting up an enlarger with the negative from which a photographic print is to be made. This is done under conditions that vary from normal room light to safelight conditions (i.e. a light source having a wavelength to which the photographic print paper is not sensitive) and a period when the enlarger light source is manually energized to permit focusing of the photographic image in the plane of the photographic print paper. After the selection of the appropriate photographic print paper and the determination of other variables, a photographic print is made by exposing the paper to the image from the enlarger by energizing the enlarger light source for a predetermined amount of time during which time the "dodging" and/or "masking" techniques might be used as explained above. The photographic print paper is then processed chemically to develop an image and then visually inspected to determine if certain areas require more or less exposure. If this is the case, the above procedure is repeated with a new piece of photographic print paper and in addition to the original over- all exposure (which might include modifications to the "dodging" and/or "masking" techniques used), selected areas of the photographic print that require more exposure are reexposed (utilizing "burning", "dodging", and/or "masking" techniques) for a length of time that is a percentage of the original exposure time duration (e.g. 25, 50, 75 or 100% of the time of the original exposure time duration). The photographic print is developed, reinspected and the above processes are continued until a satisfactory print is obtained. It is to be understood that reexposure time duration can be the percentages depicted above or multiples thereof (e.g. 125, 150, 175, 200%, etc.). Additionally, while the aforementioned descriptions and procedures involve the production of a photographic print utilizing light sensitive photographic paper, similar procedures are frequently followed utilizing any one of many other light sensitive materials used in other photographic and graphic arts applications.

Since the time periods used for the initial and subsequent exposures are very critical, it is essential that a precision timing device be used. Moreover, arriving at appropriate reexposure time durations can become mathmatically and physically cumbersome and time consuming. It is frequently difficult to reset a timing device for subsequent reexposures because the process takes place in virtual darkness and the operator performing the work is often times preoccupied with other matters associated with the printing process such as attending to filter, selecting negatives or appropriate print paper, etc. This problem becomes more complicated as the number of reexposure stages increases since in addition to the required resetting of the timing device for each subsequent reexposure, the operator must remember or record the time durations for each reexposure.

While many timing devices are available which activate a safelight and deactivate an enlarger light after a preset period of time has elapsed, they do not have the capability of being conveniently reset to time subsequent print exposure durations that are accurate, repeatable percentages of the preset period of time.

OBJECTS OF THE INVENTION

It is therefore an object of this invention to provide a novel electronic timing apparatus.

It is another object of this invention to provide a novel electronic timing apparatus which is programmable to time for a preselected time period or for a predetermined portion of the preselected time period.

It is a further object of this invention to provide a novel electronic timing apparatus for use in photographic processes which is programmable to deactivate a first energy source and activate a second energy source after a preselected time period has elapsed or after a predetermined portion of the preselected time period has elapsed.

Another object of this invention is to provide a novel electronic timing apparatus which resets itself after timing out a preselected time period or after timing out a predetermined portion of the preselected time period.

Yet another object of this invention is to provide a novel electronic timing apparatus which is programmable to time for a preselected time period or for a predetermined portion of the preselected time period and which locks out subsequent programming while timing out a function.

It is an object of this invention to provide a novel electronic timing apparatus which is programmable to time for a preselected time period or for a predetermined portion of the preselected time period and is capable of cancelling the programmed time period prior to the completion of the timing operation.

Another object of this invention is to provide a novel electronic timing apparatus which activates a first energy source and deactivates a second energy source for a preselected time period and which is capable of maintaining the first energy source in an active state and the second energy source in an inactive state whether or not the preselected time period has been timed out.

SUMMARY OF THE INVENTION

These and other objects of this invention are accomplished with a novel electronic timing apparatus which contains means for selecting a preset time interval and means for selecting an actual interval to be timed which is equal to or less than, and also a function of, the preset interval. When the clock begins timing the actual interval, a first energy source is activated and a second energy source is deactivated. When timing of the actual interval is completed, the first energy source is deactivated and the second energy source is activated. In operation, the apparatus is powered by a power supply means which furnishes a regulated direct current to integrated circuits requiring such and furnishes line frequency current to other circuits. The clock also contains means for generating and shaping periodic pulses from one frequency current to form an electronic time base signal for its operation. A time base prescaler means reduces the number of periodic pulses contained in the electronic time base signal, the reduction being proportionately responsive to a signal generated by the actual interval selection means. The time base prescaler means is continually reprogrammed with the signal generated by the actual interval selection means by a time base prescaler control logic means. An electronic counting means counts the number of periodic pulses contained in the electronic time base signal after the signal has been modified by the time base prescaler means. When the electronic counting means reaches a timed out state representative of the elapse of the actual interval being timed, a system logic control provides a signal which is used to deactivate the first energy source and activate the second energy source. Other features of the invention, such as its use in photographic applications and its ability to be reset under various timing conditions, are described below.

DETAILED DESCRIPTION OF THE INVENTION

Circuit Interrelationship

Figure 1:
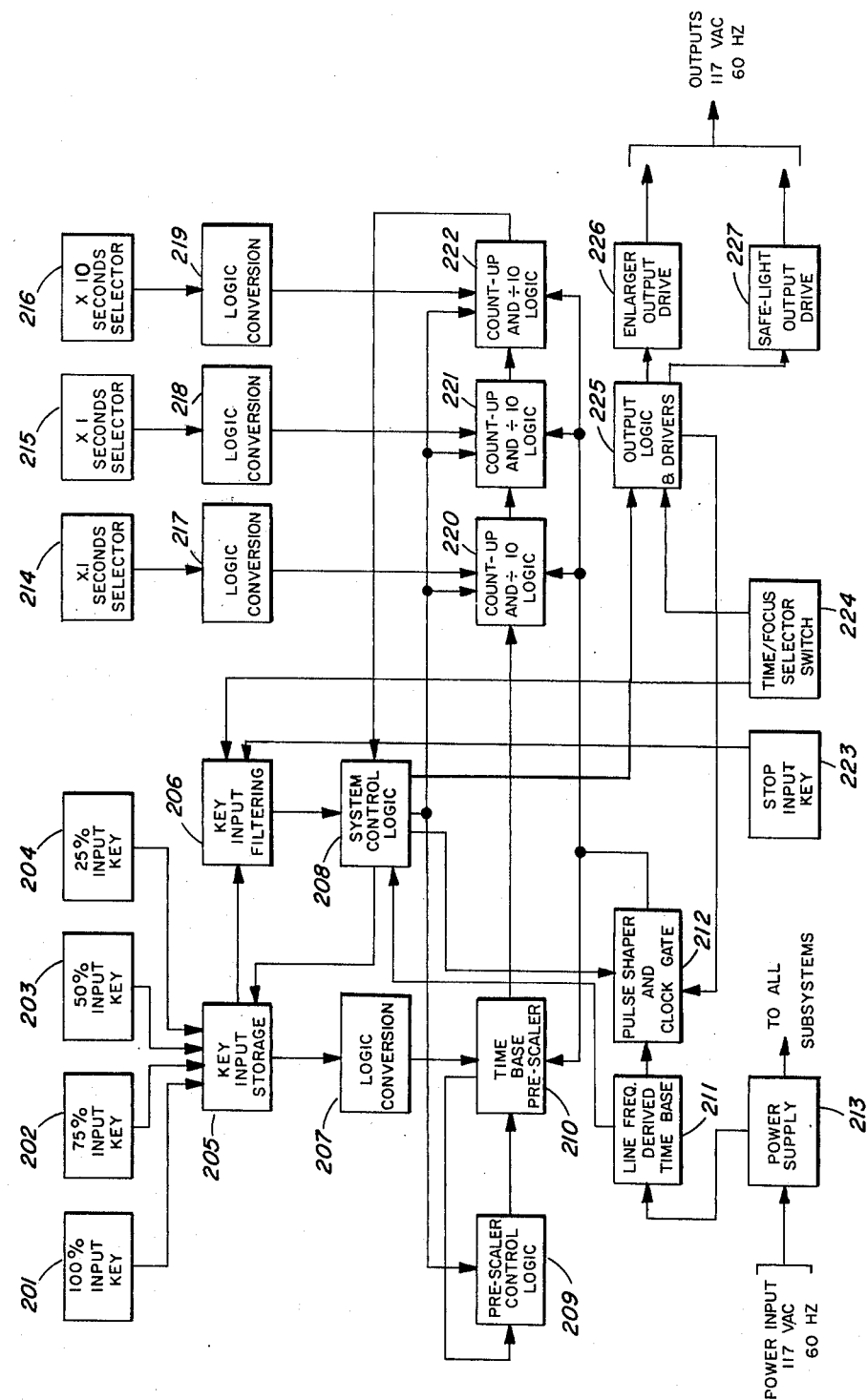
FIG. 1 is a block diagram of the functions performed by the various circuits contained in the electronic timing apparatus of this invention.

FIG. 1 shows the functional interrelationship among the various circuits employed in the apparatus of this invention. A preset time interval from 0.1 second to 99.9 seconds is selected by positioning selectors 214, 215 and 216 to the desired positions. The various positions selected provide outputs to their respective logic conversion circuits 217, 218 and 219 which convert the outputs to appropriate binary coded signals which in turn are programmed into the respective decade counters (count up and divide by 10 logic circuits 220, 221 and 222).

Power supply circuit 213 converts line current of 105–125 vac, 60 Hz to a regulated +5 vdc which powers all integrated circuits. Power supply 213 also furnishes line current which is applied directly to the enlarger and safelight outputs. Additionally, power supply circuit 213 provides line frequency derived time base circuit 211 with 60 Hz line frequency current for generating 120 pulses per second. The pulses are shaped by pulse shaper and clock gate circuit 212 and provide the clock pulse for decade counters contained in circuits 220, 221 and 222 and time base prescaler circuit 210.

Closing of any one of either 100% input key 201, 75% input key 202, 50% input key 203 or 25% input key 204 causes activation of enlarger output drive circuit 226 and deactivation of safelight drive circuit 227. Closing of one of these keys also establishes an output which is stored in key input storage circuit 205 and then converted by logic conversion circuit 207 to an appropriate binary code output which is applied to time base prescaler circuit 210. The 120 shaped period pulses per second contained in the electronic time base signal (clock pulse) from circuit 212 are applied to circuit 210 which reduces the pulse repition rate. Time base prescaler circuit 210 is enabled to divide the 120 pulses per second input by 12, 9, 6 or 3 within the same time frame when the 100, 75, 50 and 25% input keys respectively, are closed.

In order for decade counters contained in circuits 220, 221, 222 and time base prescaler circuit 210 to receive programming, each must receive a parallel enable (PE) input from system control logic circuit 208. While circuit 208 continuously receives the 120 pulses per second generated by circuit 211, it produces a single (PE) output only when one of input keys 201, 202, 203 or 204 is closed. The (PE) output is applied to decade counters 220, 221, 222 and time base prescaler circuit 210 as previously explained thereby allowing binary coded information to be programmed into each of these counters at the beginning of a timing function. Since time base prescaler circuit 210 receives only one (PE) input from circuit 208 during a timing sequence, prescaler control logic circuit 209 provides the additional subsequent (PE) inputs which are necessary to allow the four-bit binary counter contained in circuit 210 to be continually reprogrammed with information contained in storage circuit 205 and conversion circuit 207. Each time the four-bit binary counter in time base prescaler circuit 210 reaches a terminal count, an output is generated which is applied to the count enable parallel (CEP) inputs of decade counters contained in circuits 220, 221 and 222. These decade counters, connected in a synchronous counting manner, are enabled to count clock pulses from circuit 212 that are coincident with (CEP) inputs generated by the time base prescaler circuit 210 (for decade counter circuit 220); clock pulses that are coincident with (CEP) inputs from circuit 210 and terminal counts from decade counter circuit 220 (for decade counter circuit 221); and clock pulses that are coincident with (CEP) inputs from circuit 210 and terminal counts from decade counter circuit 221 (for decade counter circuit 222). When the decade counter contained in circuit 222 reaches terminal count, an output is generated that is applied to system control logic circuit 208 which in turn provides an output which is applied to output logic and driver circuit 225 thereby activating safelight output drive circuit 227 and deactivating enlarger output drive circuit 226.

Key input filtering circuit 206 eliminates the effects of electrical input noise caused by input keys 201, 202, 203 and 204. It also is designed, as explained below, to start the clock in a reset state when it is first turned on. Stop input key circuit 223 causes the apparatus to be reset i.e. safelight ON and enlarger OFF, at any time during the timing operation. TIME/FOCUS selector switch circuit 224 is designed to override all other circuits during a timing operation (except the ON/OFF switch) by forcing the enlarger output ON and safelight output OFF when in the FOCUS position. It is also designed to reset the clock i.e. enlarger output OFF and safelight output ON, when returned to the TIME position without regard to whether the programmed time has expired. In operation, the clock cannot begin timing a programmed function until one of the input keys contained in circuits 201, 202, 203 or 204 is closed.

Power Supply

Figure 2:
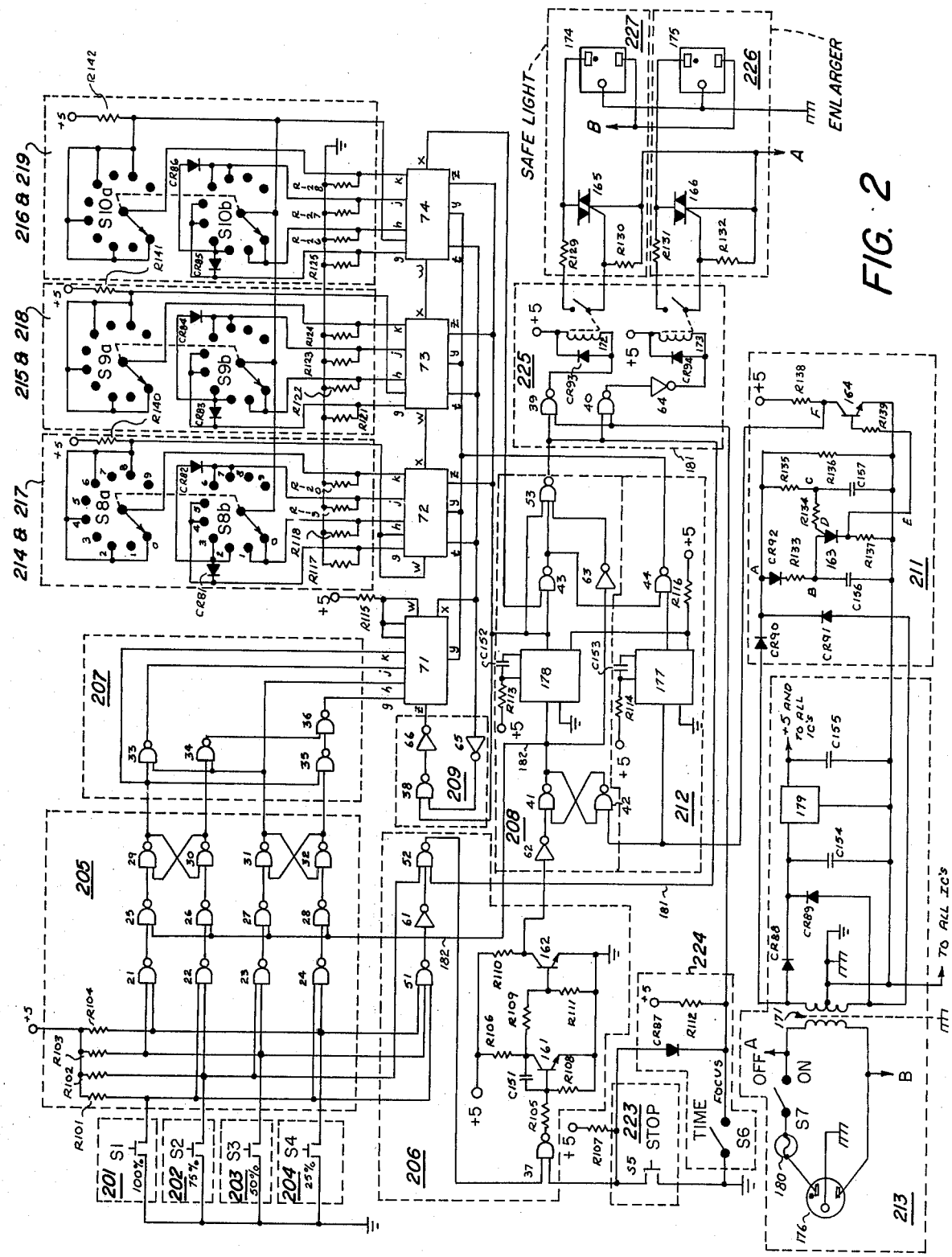
FIG. 2 is a schematic diagram of the various circuits comprising the electronic timing apparatus of this invention.

A power supply circuit 213 converts raw line current (105 to 125 vac, 60 Hz) to a regulated +5 vdc to power all integrated circuits. In FIG. 2, the alternating current is applied by lines A and B directly to enlarger output drive circuit 226 and safelight output drive circuit 227. Typical circuitry for this purpose is enclosed in area 213 of the schematic diagram of FIG. 2.

Alternating current is supplied to transformer 171 by plug 176 through fuse 180 and ON/OFF switch S7. Transformer 171 has a 12.6 vac center-tapped secondary output and with diodes CR88 and CR89 forms a full wave rectifier whose output is applied to integrated circuit voltage regulator 179. Capacitor C154 smooths out the half-wave ripple of the feed to voltage regulator 179. The +5 vdc output of 179 is further filtered by capacitor C155 and is then used to power the various integrated circuits shown in FIG. 2.

Pulse Generation and Shaping

Figure 5A:
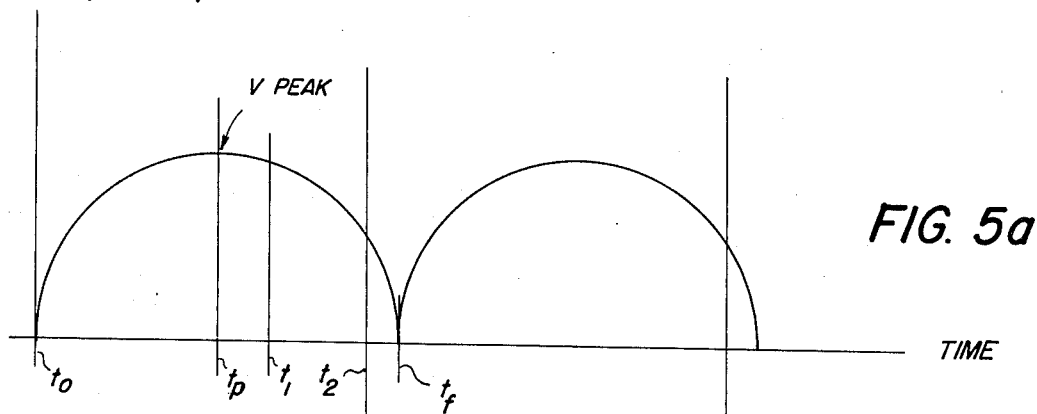
FIGS. 5a, 5b and 5c graphically show the generation and shaping of periodic pulses in a timed relation to half wave cycles.

Pulse generating circuit 211 utilizes a 60 Hz power source to produce 120 periodic pulses per second. In circuit 211 of FIG. 2, center-tapped transformer 171, (circuit 213) and diodes CR90 and CR91 form a full wave rectifier circuit. In operation, the waveform at point A is approximated in FIG. 5a. On most occasions, when transformer 171 secondary voltage is 12.6 vac, the peak voltage (V-PEAK) in FIG. 5a is about 8.3. At a time $t_o$, the voltage at point A begins to rise sinusoidally thereby forward biasing diode CR92 and charging capacitor C156 through resistor R133. Simultaneously, capacitor C157 is charged through resistor R135. The values of R133 (15K) and C156 (0.1mf) are such as to produce a longer time constant than that produced by the combination of R135 (10K) and C157 (0.1mf). As a result, the voltage at point C rises at a faster rate than the voltage at point B. This condition maintains programmable unijunction transistor (PUT) 163 in an off or blocking state. At time $t_p$, the voltage at point A peaks. At time $t_1$ (FIG. 5a), the voltage at point A is decreasing. When the voltage at point A drops below the voltage at point B, diode CR92 is reverse biased and the charge on capacitor C156 remains relatively constant. At this time, the voltage at point B is lower than the peak voltage attained at point A because of a charging phase lag. Also, the voltage at point B is lower than the voltage at point C because of the different time constants. Moreover, the voltage at point C is essentially the same as the voltage at point D since the voltage drop across resistor R134 is negligible while programmable unijunction transistor (PUT) 163 is in the OFF state. Programmable unijunction transistor 163 remains in the OFF state so long as the gate voltage at point D remains greater than that at the anode (point B).

At a point in time intermediate between $t_1$ and $t_2$, the voltage at point A becomes less than the voltage at points C and D which causes capacitor C157 to begin to discharge through the series resistor combination of R135 and R136. Near the end of the half-wave voltage cycle that occurs at Point A, at time $t_2$, the voltage at points C and D becomes less than the voltage at point B. When the difference in voltage between point D and point B is equal to the offset voltage of (PUT) 163, a current path is established between its anode and cathode which causes capacitor C156 to discharge through resistor R137. The current through resistor R137 produces a voltage pulse across R137 which represents the output of the circuit at point E. Since the time constant of C156 and R137 is relatively short, the pulse duration is also relatively short and in the form of a spike as shown in FIG. 5b.

After time $t_2$ but before the voltage at point A reaches a minimum value at $t_f$, the anode current reaches the valley current of (PUT) 163 at which time (PUT) 163 returns to its blocking state. While a current path is also established between the gate and cathode of (PUT) 163 during its conducting state, resistor R134 limits the current flow and a residual charge remains in capacitor C157. The residual charge is present after the completion of each half-wave of the 60 Hz source. This effect also insures that the voltage at point C rises faster than the voltage at point B thereby providing greater line noise immunity from the 60 Hz source.

Figure 5B:
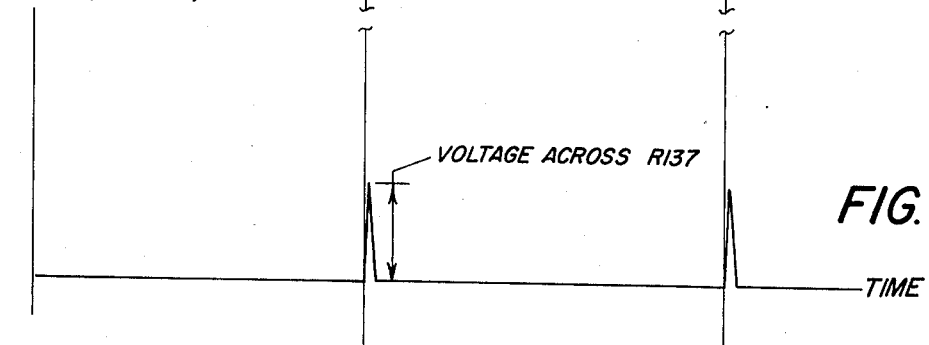
Figure 5C:
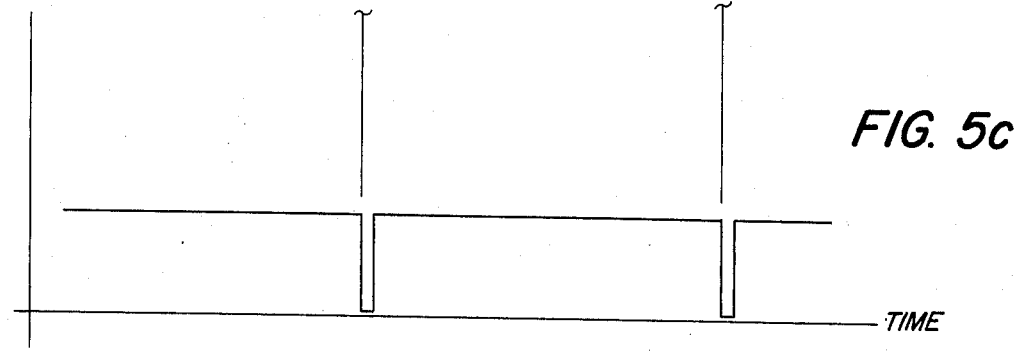

The positive going spike shaped pulse produced by (PUT) 163 of a few microsecond duration as shown in FIG. 5b turns transistor 164 on when it reaches about 0.7 vdc. Transistor 164 remains on until the pulse amplitude once again falls below approximately 0.7 vdc. While transistor 164 is on, its collector is in its low state (about 0.2 vdc above ground). At all other times the collector is maintained at 5 vdc by pull-up resistor R138. As shown in FIG. 5c, transistor 164 provides a shaped negative going (low) logic pulse at point F which is applied to multivibrator 177 and NAND gate 42 of circuits 212 and 208 respectively. This sequence is repeated for each half-wave cycle occurring at point A producing 120 pulses per second at output point F.

In addition to providing 120 pulses per second from a 60 Hz power source, the design of this circuit has a minimal number of parts while providing relatively high noise immunity from electrical noise which might be superimposed on the 60 Hz source. Also, the design of the circuit is advantageous in that the time position of the output pulse at point E is relatively stable in relation to the phase of the 60 Hz source when voltage variations occur in the 60 Hz power source. The pulse generating portion of circuit 211 is essentially self powered in that it does not require a power source other than the 60 Hz source from the center-tapped secondary of transformer 171. Among the many advantageous characteristics of circuit 211, is its ability to produce fast rise time, short duration pulses near the end of each half-wave of the 60 Hz source. This is beneficial because the enlarger and safelight outputs of this clock are controlled by bilateral alternating current solid state switches (triacs), and an output cannot be deenergized until the current in said output decreases to a level less than the holding current of the triac used. This will only occur near the end of the next half-wave cycle of line frequency current that occurs after triac triggering is inhibited (for resistive loads such as enlarger and safelight incandescent lamps). Since all actual time selection durations for this clock are timed by counting exact integer half-wave cycles of the line frequency current, timing error is reduced by starting a timing sequence near the end of a half-wave cycle of the line frequency current. The control logic (explained below) does not allow a timing sequence to begin until the first clock pulse that occurs after one of input keys S1, S2, S3 or S4 is closed.

Formation of Electronic Time Base (Clock Pulse)

The periodic pulses derived form circuit 211 are thereafter shaped by pulse shaping circuit 212 to produce an electronic time base signal (clock pulse). Circuit 212 is designed to reform the pulses generated in circuit 211 into a series of fixed duration pulses having the same repetition rate as the pulses derived from circuit 211. Circuit 212 is comprised of one-half of a dual monostable multivibrator 177, and a 2-input NAND gate 44. In operation, monostable multivibrator 171 is connected such that it produces a positive going (high) output pulse each time, and coincident with, each negative going leading edge of a pulse from pulse generating circuit 211. The duration of the pulse produced by monostable multivibrator 177 is controlled by the time constant produced by capacitor C153 and resistor R114 and is of a shorter duration than that of a corresponding negative going (low) output pulse produced by monostable multivibrator 178 as explained below. The clockpulse output from monostable multivibrator 177 forming the electronic time base signal is applied as an input to NAND gate 44. The output of NAND gate 44 is applied to the clock input of decade counters 72, 73, 74 and 4-bit binary counter 71.

System Control Logic

Monostable multivibrator 178 is of the same type as 177 but is designed and connected to provide an output in the form of a negative going (low) output pulse which is of longer duration than the high output pulse of monostable multivibrator 177 and is coincident with a negative going leading edge of a pulse applied to its input. Monostable multivibrator 178 operates in response to the closure of switch S1, S2, S3 or S4. Prior to the closure of switch S1, S2, S3 or S4, the input to NAND gate 41 from the output of inverter 62 is low and its output is high. Therefore, one of the inputs of NAND gate 42 forming the remaining part of a cross-coupled flip-flop is high and its remaining input fluctuates from low to high corresponding to the pulses generated by the circuit 211. The output of NAND gate 42 thereby fluctuates from low to high as a result of input fluctuations from circuit 211. In any case, multivibrator 178 does not provide a low output pulse while its input remains high. When switch S1, S2, S3 or S4 is closed, the output of inverter 62 goes high and the next negative going pulse from pulse generating circuit 211 into one input of NAND gate 42 causes the cross-coupled flip-flop formed by NAND gates 41 and 42 to change state; i.e. the output of NAND gate 41 goes low and the output of NAND gate 42 (and its associated input to NAND gate 41) goes and remains high. When the output of NAND gate 41 (and input of monostable multivibrator 178) goes from high to low upon closing one of the aforementioned switches and a negative going pulse from circuit 211, a low output pulse is produced by monostable multivibrator 178. As previously described, the low output pulse is longer than the pulse generated by monostable multivibrator 177. The duration of the pulse is controlled by the time constant of capacitor C152 and resistor R113. Until the clock reaches a timed out state, the input of NAND gate 41 remains high and no additional negative going pulses can be generated by monostable multivibrator 178. Even if S1, S2, S3 or S4 is closed momentarily, the input of NAND gate 41 remains high due to the design of remaining portions of circuits 208 and 206. More specifically, the output of NAND gate 41 and the input of inverter 63 are low, the output of inverter 63 and an input of NAND gate 53 are high, another input of NAND gate 53 is high (after the single low pulse from monostable multivibrator 178 has been completed) and the third input of NAND gate 53 is high (since one input of NAND gate 43 is high after the single low pulse from monostable multivibrator 178 has been completed and the other input of NAND gate 43 is low until the clock is timed out as explained below), the output of NAND gate 53 and one input of NAND gate 52 of circuit 206 are low, the output of NAND gate 52 and one input of NAND gate 37 are high, while switch S6 is in the TIME position, the remaining input of NAND gate 37 is high, the output of NAND gate 37 and input to inverter 62 of circuit 208 are low, the output of inverter 62 and one input of NAND gate 41 are high, the remaining input of NAND gate 41 is high as previously explained and the output of NAND gate 41 is low, etc. The negative going low pulse produced by monostable multivibrator 178 is applied as the Parallel Enable (PE) input to four-bit binary counter 71 and decade counters 72, 73 and 74. The pulse is also applied as an input to NAND gate 43 thereby rendering the output terminal of NAND gate 43 in a high state as well as an input terminal of NAND gate 44 in circuit 212. As previously explained the positive going (high) clock pulse from multivibrator 177 is applied as an input to NAND gate 44. The low output from NAND gate 44 is applied as the clock pulse input to decade counters 72, 73, 74 and four-bit binary counter 71. When both the (PE) and clock pulse inputs of these counters are low, they are enabled to receive programmed information in inputs $g$, $h$, $j$ and $k$.

Time Base Prescaler, Input Keys, Key Input Storage, Key Input Logic

The 120 periodic pulses per second output forming the electronic time base signal from clock pulse circuit 212 are reduced in number by time base prescaler circuit 210, which is comprised of 4-bit binary counter 71. The extent of the reduction is responsive to a binary coded signal received in parallel form from logic conversion circuit 207, key input storage circuit 205 and initiated by closing any one of input keys S1, S2, S3 or S4. Input keys S1, S2, S3 and S4 are each comprised of standard momentary contact, normally open switches preferably of the push botton type which are closed (i.e. in the ON position) by depression of the key. Key input storage circuit 205 is typically comprised of 12 2-input NAND gates, 21, 22, 23, 24, 25, 26, 27, 28, 29, 30, 31 and 32, arranged in the manner shown in FIG. 2. The outputs from storage circuit 205 are converted to the proper binary code by NAND gates 33, 34, 35 and 36 contained in conversion circuit 207. The output from conversion circuit 207 provides a binary coded signal to four-bit binary counter 71 reflective of the particular input key S1, S2, S3 or S4 which is closed. The four outputs from logic conversion circuit 207 are applied as binary inputs to four-bit binary counter 71 to enable it to divide the 120 pulse per second input by 12, 9, 6 or 3 respectively within the same time frame depending upon whether the 100% (S1), 75% (S2), 50% (S3) or 25% (S4) input key is closed. As a result of the division, output X of time base prescaler 71 is either 10, 13.333, 20 or 40 pulses per second. The enabling logic sequence for these circuits is readily apparent to those skilled in the art from FIG. 2. The various binary codes provided as inputs $g$, $h$, $j$ and $k$ to 71 by input keys S1, S2, S3 and S4 are set forth in Table I.

TABLE I

| Input Key | % | Starting Decimal Count | Input to 71 | | | |
|---|---|---|---|---|---|---|
| | | | k | j | h | g |
| S1 | 100 | 4 | 0 | 1 | 0 | 0 |
| S2 | 75 | 7 | 0 | 1 | 1 | 1 |
| S3 | 50 | 10 | 1 | 0 | 1 | 0 |
| S4 | 25 | 13 | 1 | 1 | 0 | 1 |

NAND gates 29, 30, 31 and 32 form two cross-coupled flip-flops which store the information supplied by the closure of one of four input keys S1, S2, S3, or S4. The information stored in these two flip-flops is continuously applied to conversion circuit 207 which in turn continually reprograms four-bit binary counter 71 with the appropriate binaryy coded signal. Key input storage circuit 205 is enabled to receive key input information only while line 182 is high (i.e. when the clock is in a timed out condition as explained below). After a timing function is initiated, line 182 goes low and prevents any additional input key closures from changing the states of the cross-coupled flip-flops formed by gates 29, 30, 31 and 32.

Input Filtering And Start Up Circuits

These circuits reduce the effect of electrical input key noise and also cause the clock to start in a reset state when ON/OFF switch S7 is placed in the ON position. The start up circuit contains NAND gate 37, NPN transistors 161 and 162 and their accompanying circuitry, inverter 62, NAND gate 41, inverter 63, NAND gate 53, line 181 and NAND gate 52 (see FIG. 2). This circuit has two stable states, but in order for the clock to start in a reset state, it is essential that line 181 be in the high state (i.e. output of NAND gate 53 high). As shown in FIG. 2, when line 181 is high and TIME/FOCUS switch S6 is in the TIME position, the safelight output is ON and the enlarger output is OFF. When ON/OFF switch S7 is first placed in the ON position, the power supply from circuit 213 rises quickly from 0 to +5 vdc. The voltage divider formed by R106, R109 and R111 prevents transistor 162 from turning on until the power supply voltage has risen to the 2.4 vdc to 2.8 vdc range. At this time, the collector of transistor 162 is high and all gates in the start-up circuit begin to function as inverters thereby rendering the output of NAND gate 37 in the high state. The base of transistor 161 is forward biased at this time thereby placing transistor 161 in an on state. This maintains transistor 162 in an off state (i.e. collector high). It is to be noted that while the start-up sequence occurs in a few milliseconds, the start-up circuit has been started with line 181 in the required high state.

When one of switches S1, S2, S3 or S4 is closed, the mode of the circuit is reversed i.e. one of the inputs of NAND gate 52 is low. The output of NAND gate 52 and both inputs of NAND gate 37 are high (STOP input key not depressed), the output of NAND gate 37 and the base of transistor 161 are low. The collector of transistor 161 is high and the base of transistor 162 is forward biased thereby placing transistor 162 in the on state (i.e. collector low). The outputs of 62, 41, 63 and 53 are high, low, high and low respectively thereby rendering line 181 in a low state causing the enlarger output to go ON and the safelight output to go OFF.

With regard to the filtering features of circuit 206 of FIG. 2, the negative feedback produced by capacitor C151 reduces the switching speed of transistor 161 thereby reducing the susceptibility of the circuit to a change of state due to noise caused by switches S1, S2, S3 and S4 and elsewhere.

Time Base Prescaler And Prescaler Control Logic Circuits (209 and 210)

As previously explained monostable multivibrator 178 produces a negative going (low) output pulse responsive to a negative going input resulting from activating one of switches S1, S2, S3 or S4. This pulse occurs just as the input goes low. The low output pulse is applied to NAND gate 38 thereby causing its output to be high. Therefore the output of inverter 66 and parallel enable input z of four-bit binary counter 71 are correspondingly low. The clock pulse output of NAND gate 44 is low as previously mentioned since monostable multivibrator 177 is providing positive going (high) output pulses (Note: any parallel enable pulse generated by monostable multivibrator 178 has its leading edge coincident with the leading edge of a clock pulse from monostable multivibrator 177 due to the flip-flop formed by NAND gates 41 and 42). The clock pulse output from NAND gate 44 is applied to clock pulse input terminal y of four-bit binary counter 71. When the clock pulse input and parallel enable inputs are both low, four-bit binary counter 71 is enabled to accept binary information through inputs $g$, $h$, $j$ and $k$ thereby enabling it to start counting at decimal 4, 7, 10 or 13 when the 100% (S1), 75% (S2), 50% (S3) or 25% (S4) input keys, respectively, are closed (refer to TABLE 1). Until four-bit binary counter 71 has reached terminal count (decimal 15) output line X and the input of inverter 65 are low. The input of NAND gate 38 from the output of inverter 65 is high. The remaining input of NAND gate 38 is also high since monostable multivibrator 178 supplied only one negative going (low) output pulse upon the closure of one of switches S1, S2, S3 or S4. When four-bit binary counter 71 reaches terminal count (decimal 15), output line X goes high and through inverter 65, NAND gate 38 and inverter 66 provides a low input to parallel enable input terminal $z$. On the next low clock pulse into terminal $y$, four bit-binary counter 71 is again programmed with binary information in inputs $g, h, j$ and $k$. The process is repeated each time four-bit binary counter 71 reaches terminal count. The pulse repetition rate at output terminal X is therefore, the clock pulse repetition rate (120 pulses per second) divided by 12, 9, 6, or 3 depending upon whether the 100% (S1), 75% (S2), 50% (S3) or 25% (S4) input key is closed.

Counter Circuits

The modified electronic time base signal containing a reduced number of pulses per second is applied from four-bit binary counter 71 to decade counters 72, 73 and 74. While any of several types of electronic counters capable of sensing and registering electronic pulses of the type contained in the modified electronic time base signal is sufficient, the type used are synchronous binary coded decimal decade counters (÷ 10) which are capable of being programmed to start counting at any decimal integer from 0 to 9. As shown in FIG. 2, decade counters 72, 73 and 74 are programmed to count up from a number preset by selector switches S8a, S8b, S9a, S9b, S10a and S10b. While the selector switches and each of their corresponding logic conversion circuits shown in FIG. 2 are designed to program decade counters 72, 73 and 74 to count 1/10, 1 and 10 second intervals, it is understood that each can be programmed in a manner to read larger or smaller intervals. The desired time selected by presetting switches S8, S9 and S10 is converted to a set of binary coded signals which are programmed into decade counters 72, 73 and 74 through input terminals $g, h, j$ and $k$. The binary code used for each of the inputs $g, h, j$ and $k$ is set forth in Table II below.

TABLE II

| Switch Position | Starting Decimal Count | Input to 72, 73 and 74 | | | |
|---|---|---|---|---|---|
| | | k | j | h | g |
| 0 | 9 | 1 | 0 | 0 | 1 |
| 1 | 8 | 1 | 0 | 0 | 0 |
| 2 | 7 | 0 | 1 | 1 | 1 |
| 3 | 6 | 0 | 1 | 1 | 0 |
| 4 | 5 | 0 | 1 | 0 | 1 |
| 5 | 4 | 0 | 1 | 0 | 0 |
| 6 | 3 | 0 | 0 | 1 | 1 |
| 7 | 2 | 0 | 0 | 1 | 0 |
| 8 | 1 | 0 | 0 | 0 | 1 |
| 9 | 0 | 0 | 0 | 0 | 0 |

It is apparent from FIG. 2 that switches S8($b$), S9($b$) and S10($b$) operate in conjunction with their ganged counterparts S8($a$), S9($a$) and S10($a$) respectively, to establish the desired code to be programmed into decade counters 72, 73 and 74. In order to program information into decade counters 72, 73 and 74 through inputs $g, h, j$ and $k$, clock pulse input $y$ and parallel enable input $z$ must be low. Thus, information can be programmed only when one of switches S1 through S4 is closed which causes one low parallel enable pulse to be supplied by monostable multivibrator 178. Decade counters 72, 73 and 74 are enabled to count a clock pulse only when inputs $t$ (count enable parallel), $w$ (count enable trickle), and $z$ (parallel enable) are high. Since the $t$ input of decade counter 72 is connected to terminal count output X of four-bit binary counter 71, decade counter 72 counts only clock pulses coincident with terminal counts from four-bit binary counter 72 (input $w$ of decade counter 72 is held high continuously by the 5 vdc power supply and resistor R140). Decade counter 73 counts only clock pulses coincident with terminal counts from four-bit binary counter 71 and decade counter 72. Decade counter 74 counts only clock pulses coincident with terminal counts from four-bit binary counter 71 and decade counters 72 and 73. Decade counters 72, 73 or 74 will reflect a terminal count output at output X only if its respective count enable trickle input is high. Therefore, a terminal count output (high) does not occur at the X output of decade counter 74 until decade counters 72, 73 and 74 simultaneously reach terminal count (decimal 9).

Decade counters 72, 73 and 74 are internally decoded at a terminal count of decimal 9 and internally reprogrammed to a decimal count of 0. Therefore, as connected in FIG. 2, each decade counter counts up from a decimal number between 0 and 9 (as programmed into inputs $g, h, j$ and $k$ by each decade counter's respective preset selector switch) and then, at terminal count, will reset itself to decimal 0. Decade counters 72, 73 and 74 therefore, continue to count decimal 0 through 9 (as enabled) until they all reach terminal count simultaneously. Therefore, when four-bit binary counter 71 is programmed to divide by 12 (i.e. 100% input key depressed), decade counter 72 is enabled to advance count at 0.1 second intervals, decade counter 73 at 1.0 second intervals and decade counter 74 at 10 second intervals.

In order to program the clock to time out a period of 0.5 seconds, for example, switches S8($a$&$b$), S9($a$&$b$) and S10($a$&$b$) are set to positions 5, 0 and 0, respectively. These switches along with their respective logic conversion circuits cause decade counters 72, 73 and 74 to assume a preset decimal count of 4, 9 and 9, respectively, when a timing function is initiated upon depressing one of input keys S1 through S4. In this case, upon depressing the 100% input key (s1), four-bit binary counter 71 is programmed to divide by 12 causing decade counter 72 to advance count at 0.1 second intervals. After five such intervals have elapsed, decade counters 72, 73 and 74 are all at terminal count (decimal 9). A high output terminal count is then reflected at output X of decade counter 74. This causes an input of NAND gate 43 to be high. The remaining input of NAND gate 43 is also high rendering its output low. Therefore, the output of NAND gate 53 and all inputs of NAND gates 39 and 40 of circuit 222 are high (TIME/FOCUS switch in TIME position) and force the enlarger output OFF and the safelight output ON. An input of NAND gate 44 of circuit 212 is also low maintaining its output high and inhibiting clock pulses to all counters. Since line 181 is now high, the start up circuit is returned to the start up mode.

Output Logic And Driver Circuit 225, Enlarger Output Circuit 226, Safelight Output Circuit 227

While the clock is timing, the enlarger output of circuit 226 is ON and the safelight output of circuit 227 is OFF. There circuits are controlled by output logic and driver circuit 225. The inputs and outputs of NAND gates 39 and 40 are identical. Thus, before the clock is timed out, output X from decade counter 74 and an input of NAND gate 43 are low, its output and an input of NAND gate 53 are high, the input to NAND gate 53 from monostable multivibrator 178 is high, the input to NAND gate 53 from inverter 63 is also high as previously explained. This causes the output of NAND gate 53 to be low and is applied to the inputs of NAND gates 39 and 40. The remaining inputs to NAND gates 39 and 40 are high. Reed switch relay coil 172 is connected between the 5 vdc source and the high output of NAND gate 39. Since there is no appreciable voltage drop across relay coil 172, the switch remains open and the safelight output is OFF. The high output of NAND gate 40 is inverted by inverter 64 to a low output thereby energizing reed relay 173. In this instance, the reed switch is closed triggering triac 166 through resistor R131 and the enlarger output is ON.

When the clock is timed out, decade counters 72, 73 and 74 reach terminal count rendering output X of decade counter 74 and an input of NAND gate 43 high. The remaining input of NAND gate 43 is high as previously explained and its output and input of NAND gate 53 are low. The output of NAND gate 53 and an input of NAND gates 39 and 40 are high. The remaining inputs of NAND gates 39 and 40 are also high (TIME/FOCUS switch in TIME position). Therefore, the output of NAND gate 39 is low thereby energizing reed relay 172 causing the switch to close, triggering triac 165 through resistor 129 and rendering the safelight output ON. The output of NAND gate 40 is low but is inverted by inverter 64 whose output is high. Reed relay 173 is unenergized and the enlarger output OFF. Inverter 64 of circuit 225 is responsible for the reciprocal ON/OFF functions assumed by circuits 226 and 227.

Stop Input Key (Circuit 223)

Closing STOP key, switch S5, causes the enlarger output to go OFF and the safelight output to go ON at any time during the timing process. Also, the clock is reset when switch S5 is closed. Upon closing S5 while the clock is timing, an input of NAND gate 37 goes low. The output of NAND gate 37 goes high and forward biases the base of transistor 161. The collector of transistor 161 and base of transistor 162 are low and therefore the collector of transistor 162 is high. The output of inverter 62 and an input of NAND gate 41 are low. The output of NAND gate 41 and input of inverter 63 are high. The output of inverter 63 and input of NAND gate 53 are low; the output of NAND gate 53 and in input of NAND gates 39 and 40 are high. The remaining inputs of NAND gates 39 and 40 remain high since diode CR87 is reverse biased when switch S5 is closed. As previously explained, when all inputs to NAND gates 39 and 40 of circuit 225 are high, the safelight output is ON and the enlarger output OFF.

Time/Focus Selector (Circuit 224)

Placement of TIME/FOCUS switch S6 from the TIME to the FOCUS position causes the enlarger output to go ON and safelight output to go OFF. The switch is designed to override all other circuits and controls except ON/OFF switch S7. Also, when the switch S6 is returned to the TIME position, the clock is reset i.e. enlarger OFF and safelight ON, even if a previously programmed timing function has been initiated and has not completely timed out.

When switch S6 is moved from the TIME to the FOCUS position while the clock is operatively timing a function, an input of both NAND gates 39 and 40 in circuit 225 is low since one side of switch S6 is connected to ground. The outputs of NAND gates 39 and 40 are high thereby maintaining the safelight output OFF and the enlarger output ON. The clock is in a reset state (enlarger output OFF, safelight output ON) when TIME/FOCUS switch S6 is returned to the TIME position because an input of NAND gate 37 is pulled low through diode CR87 when the switch is in the FOCUS position. The effect of this is to cause the start-up circuit (NAND gate 37, NPN transistors 161 and 162 and their accompanying circuitry, inverter 62, NAND gate 41, inverter 63, NAND gate 53, line 181 and NAND gate 52) to return to the start-up mode (line 181 in high state).

Operation

Figure 4:
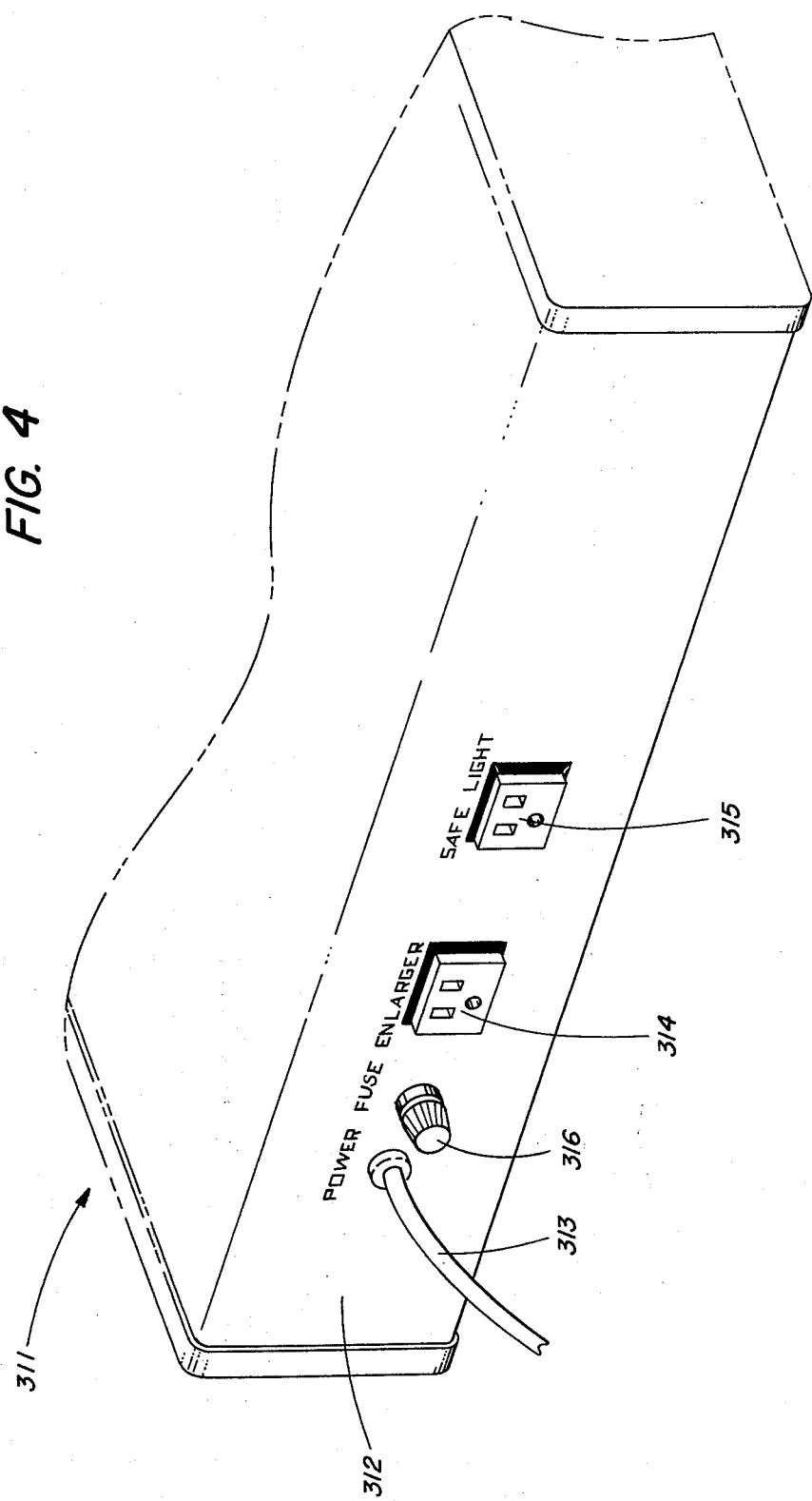
FIG. 4 is a diametric view showing the rear and top panels of the electronic timing apparatus of this invention.

In order to operate the apparatus, the energy sources to be energized and deenergized are connected to outlets 314 and 315 positioned in the rear panel 312 as shown in FIG. 4. Power supply line 313 and fuse 316 are also provided on rear panel 312 of apparatus 311. When used in photographic processing, an enlarger is connected to output 314 and a safelight to 315.

Figure 3:
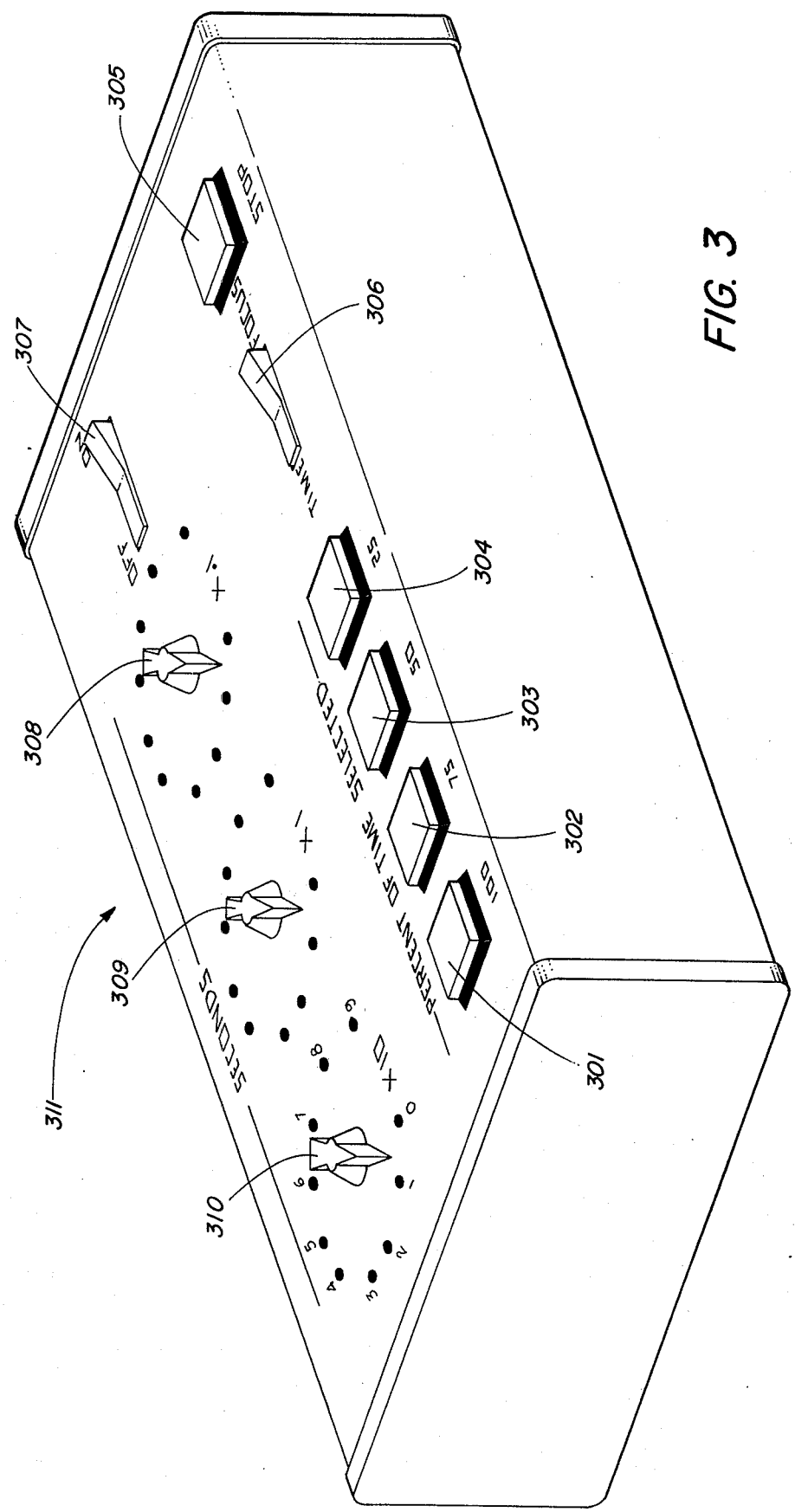
FIG. 3 is a diametric view showing the front and top panels of the electronic timing apparatus of this invention.

When the apparatus is placed in operation, ON/OFF switch 307 of FIG. 3 is placed in the ON position. The desired interval from 0.1 seconds to 99.9 seconds is preset by placing selection knobs 308, 309 and 310 in the appropriate position. TIME/FOCUS switch 306 is placed in the TIME position. Thereafter, the timing operation is started by momentarily depressing any one of buttons 301, 302, 303 or 304. In photographic printing applications, it is the usual practice to activate the enlarger light source for 100% of the preset time interval; thus, button 301 would be depressed. After the preset time interval has elapsed, the enlarger automatically goes off and the safelight on. Should the print require 25, 50, 75 or 100% additional exposure in any particular area, utilizing a "burning", "dodging" or "masking" technique, a second exposure is accomplished by depressing either button 301, 302 303 or 304 which causes a second exposure for a period of time which is either 100, 75, 50 or 25% of the preset time. The operation is repeated for subsequent exposures until an acceptable print is obtained. It should be noted that it is not necessary to reset the positions of knobs 308, 309 or 310 for each subsequent time period which differs from the initial time period. Depression of STOP button 305 at any time while the clock is timing a function causes the safelight to go ON and the enlarger OFF. When TIME/FOCUS switch 306 is moved to the FOCUS position, the enlarger is energized and safelight deenergized to permit the operator to make necessary focusing adjustments. If the clock is timing out a function when TIME/FOCUS switch 306 is placed in the FOCUS position, and is returned to the TIME position prior to the completion of the timing function, the circuitry of the clock designed so that the clock will be returned to a reset state with the enlarger OFF and safelight ON. Also, after the clock has been started and is timing out a function, the circuitry is designed to that subsequent movement of knobs 308, 309 and 310 or depression of buttons 301, 302, 303 and 304 has no effect on the timing accuracy. There is also no effect on the timing accuracy if a button such as 301, 302, 303 or 304 is depressed for longer than the interval being timed. After the timed interval has elapsed, the clock remains in the reset state until the depressed button is released and depressed again.

The electronic timing apparatus described herein is capable of timing intervals ranging from 0.025 seconds to 99.900 seconds. Timing accuracy is not effected by input voltage variations from 105 vac to 125 vac. While the illustration of the operation of the apparatus described herein has been described using digital circuitry, it is understood that the invention also includes apparatus performing the same function utilizing analog circuitry.

PARTS LIST

| Part | Description |
| --- | --- |
| S1 through S5 | Momentary contact, normally open pushbutton switch. |
| S6 & S7 | Single pole, single throw (SPST) rocker switch. |
| S8 through S10 | Double pole, 10 position rotary switch. |
| 171 | Transformer: 117 vac primary, 12.6 vac, 1.0 amp center-tapped secondary. |
| 172 & 173 | Reed relay: Single pole, single throw (SPST form A), 5.0 vdc coil. |
| 21 through 44 | 2-input NAND gates of six quad, 2-input NAND gate integrated circuits type 7400. |
| 51 through 53 | 3-input NAND gates of one triple, 3-input NAND gate integrated circuit type 7410. |
| 61 through 66 | Inverter of one six inverter integrated circuit type 7404. |
| 71 | 4-bit binary counter integrated circuit type 74161. |
| 72 through 74 | Synchronous decimal decade counter integrated circuit type 74160. |
| C151, C155, C156, C157 | 0.1 μf, 50 vdc capacitor. |
| C152 | 0.047 μf, 50 vdc capacitor. |
| C153 | 0.01 μf, 50 vdc capacitor. |
| C154 | 3000 μf, 12 vdc electrolytic capacitor. |
| 161, 162, 164 | NPN transistor type 2N5824. |
| 163 | Programmable unijunction transistor type 2N6027. |
| 165, 166 | 8 amp, 200 v triac. |
| 177 & 178 | Each is one-half of a dual monostable multivibrator integrated circuit type 9602. |
| 179 | +5 vdc fixed output voltage regulator integrated circuit type 7805. |
| 180 | 8 amp fuse. |
| CR81 through CR87 and CR90 through CR94 | Silicon diode type 1N914B. |
| CR88 and CR89 | Silicon diode type 1N4003. |
| 176 | Standard 3-prong 117 vac grounding type plug. |
| 174, 175 | Standard 117 vac receptacle with ground. |
| R101 through R104, R107, R112, R115, R116, R138 | 1.0 K, ¼ watt resistor. |
| R105, R108, R113, R114 | 27.0 K, ¼ watt resistor. |
| R106, R109, R133 | 15.0 K, ¼ watt resistor. |
| R110, R111, R135 | 10.0 K, ¼ watt resistor. |
| R117 through R128 | 390 ohms, ¼ watt resistor. |
| R129, R131 | 100 ohms, ½ watt resistor. |
| R130, R132 | 220 ohms, ¼ watt resistor. |
| R134 | 220 K, ¼ watt resistor. |
| R136 | 1.5 K, ¼ watt resistor. |
| R137 | 33 ohms, ¼ watt resistor. |
| R139 | 100 ohms, ¼ watt resistor. |
| R140, R141, R142 | 56 ohms, ¼ watt resistor. |

The invention has been described in detail with particular reference to certain preferred embodiments thereof, but it will be understood that variations and modifications can be effected within the spirit and scope of the invention.

We claim:

1. Electronic timing apparatus for use in combination with a photographic enlarger light power source comprising:
   a. power supply means for converting line frequency alternating current to a regulated direct current;
   b. means for generating and shaping periodic pulses from a line frequency current, said periodic pulses forming an electronic time base signal for the operation of said apparatus;
   c. preset exposure time means for presetting the time period the enlarger light source is to provide exposure for a photographic print;
   d. actual exposure time selection means for selecting the actual exposure time period and for generating a signal representative of the actual time period for which the enlarger light source is to provide exposure for a photographic print, said actual exposure time period being of equal or lesser duration than said preset time period and an arithmetic function thereof;
   e. time base prescaler means for reducing the number of periodic pulses per second in said electronic time base signal, said periodic pulses being proportionately reduced responsive to the signal generated by the actual exposure time selection means;
   f. time base prescaler control logic means for reprogramming the time base prescaler means with the signal generated by the actual exposure time selection means;
   g. electronic counting means for counting the number of periodic pulses contained in the electronic time base signal after said signal has been modified by the time base prescaler means;
   h. system logic control means for providing a controlled output signal when the electronic counting means reaches a timed out state representative of the actual exposure time period; and
   i. an enlarger light power source which is deactivated by the controlled output signal from said system control logic.

2. The apparatus of claim 1 wherein the means for generating and shaping periodic pulses utilizes 60 Hz line frequency current to generate 120 pulses per second.

3. The apparatus of claim 1 wherein the preset exposure time means is utilized to provide a preset time period in tenths of a second.

4. The apparatus of claim 1 wherein the actual exposure time selection means is utilized to provide an actual exposure time period which is 25, 50, 75 or 100% of the preset time period.

5. The apparatus of claim 2 wherein the time base prescaler means reduces the number of pulses per second in the electronic time base signal by dividing said pulses per second by 12, 9, 6 or 3.

6. The apparatus of claim 1 wherein the electronic counting means comprises at least one synchronous four-bit binary counter.

7. The apparatus of claim 1 wherein the electronic counting means comprises a series of three synchronous binary coded decimal decade counters, the first of which counts pulses, the second of which counts pulses in sets of ten with respect to the first counter and the third of which counts pulses in sets of one hundred with respect to the first counter.

8. The apparatus of claim 1 including a safelight power source which is activated by the controlled output signal from said system control logic.

9. The apparatus of claim 8 including an output logic and driver means for generating a signal to deactivate the enlarger light power source and activate the safelight power source responsive to the controlled output signal from the system control logic.

10. The apparatus of claim 1 including a switch means for manually activating the enlarger light power source and overriding the controlled output signal from the system control logic.

11. The apparatus of claim 1 including a stop input switch means for manually deactivating the enlarger light power source and activating the safelight power source at any time while the apparatus is timing a function.

12. The apparatus of claim 1 wherein the periodic pulses of the electronic time base signal are generated near the end of each half wave cycle of the line frequency current.

13. The apparatus of claim 12 wherein the means for generating and shaping periodic pulses near the end of a half wave cycle comprises:
   a. a full wave rectifier circuit comprising a first diode, a second diode and a transformer;
   b. a circuit having a programmable unijunction transistor (PUT), a first time constant means for controlling the (PUT) anode potential, a second time constant means for controlling the (PUT) gate potential and a diode for controlling the charging of one of said time constant means; and
   c. a squaring and buffer stage comprising a transistor, a direct current source and a pull-up resistor connected to the collector of said transistor and to the direct current source.

14. Electronic timing apparatus for activating and deactivating an energy source comprising:
   a. power supply means for supplying a regulated direct current to integrated circuits in the apparatus and for supplying line frequency current to the remaining circuits in the apparatus;
   b. means for generating and shaping periodic pulses from the line frequency current, said periodic pulses forming an electronic time base signal for the operation of said apparatus;
   c. preset activation time means for presetting the time period the energy source is to remain in an active state;
   d. actual energy time selection means for selecting the actual energy time period and for generating a signal representative of the actual time period for which the energy source is to remain in an active state, said actual energy time period being of equal or lesser duration than said preset time period and an arithmetic function thereof;
   e. time base prescaler means for reducing the number of periodic pulses per second in said electronic time base signal, said periodic pulses being proportionately reduced responsive to the signal generated by the actual energy time selection means;
   f. time base prescaler control logic means for reprogramming the time base prescaler means with the signal generated by the actual energy time selection means;
   g. electronic counting means for counting the number of periodic pulses contained in the electronic time base signal after said signal has been modified by the time prescaler means;
   h. system logic control means for providing a controlled output signal when the electronic counting means reaches a timed out state representative of the actual energy time period; and
   i. an energy source which is deactivated by the controlled output signal from said system control logic.

15. Novel electronic timing apparatus for activating and deactivating a device comprising:
   a. power supply means for supplying a regulated direct current to integrated circuits in the apparatus and for supplying line frequency current to the remaining circuits in the apparatus;
   b. means for generating and shaping periodic pulses from the line frequency current, said periodic pulses forming an electronic time base signal for the operation of said apparatus;
   c. preset activation time means for presetting the time period the device is to remain in an active state;
   d. actual energy time selection means for selecting the actual energy time period and for generating a signal representative of the actual time period for which the device is to remain in an active state, said actual energy time period being of equal or lesser duration than said preset time period and an arithmetic function thereof;
   e. time base prescaler means for reducing the number of periodic pulses per second in said electronic time base signal, said periodic pulses being proportionately reduced responsive to the signal generated by the actual energy time selection means;
   f. time base prescaler control logic means for reprogramming the time base prescaler means with the signal generated by the actual energy time selection means;
   g. electronic counting means for counting the number of periodic pulses contained in the electronic time ase signal after said signal has been modified by the time base prescaler means;
   h. system logic control means for providing a controlled output signal when the electronic counting means reaches a timed out state representative of the actual energy time period; and
   i. a device which is deactivated by the controlled output signal from said system control logic.

* * * * *